US012416170B2

(12) United States Patent
Mirza et al.

(10) Patent No.: US 12,416,170 B2
(45) Date of Patent: Sep. 16, 2025

(54) SAFETY GATES FOR ELEVATED PLATFORMS, AND RELATED METHODS OF USE

(71) Applicant: Loadgate Industries Ltd., Edmonton (CA)

(72) Inventors: Munsoor Mirza, Edmonton (CA); Barrett Ingram, Leduc (CA); Jonathan Breton, Edmonton (CA); Ken Hardman, Edmonton (CA)

(73) Assignee: LOADGATE INDUSTRIES LTD., Edmonton (CA)

( * ) Notice: Subject to any disclaimer, the term of this patent is extended or adjusted under 35 U.S.C. 154(b) by 507 days.

(21) Appl. No.: 17/832,148

(22) Filed: Jun. 3, 2022

(65) Prior Publication Data

US 2022/0412108 A1 Dec. 29, 2022

(51) Int. Cl.
*E04G 21/16* (2006.01)
*E06B 11/02* (2006.01)

(52) U.S. Cl.
CPC .......... *E04G 21/166* (2013.01); *E06B 11/022* (2013.01)

(58) Field of Classification Search
CPC ........ E06B 11/022; E06B 11/02; E06B 11/00; E04G 21/166
See application file for complete search history.

(56) References Cited

U.S. PATENT DOCUMENTS 3,895,460 A * 7/1975 Lubmann ................ E06B 11/02 49/131
4,150,510 A * 4/1979 Harrison ................. E06B 11/00 52/64
4,422,264 A * 12/1983 Harris ..................... E06B 11/00 49/121
5,546,703 A 8/1996 Conway
(Continued)

FOREIGN PATENT DOCUMENTS

EP 0329535 8/1989
GB 2197373 5/1988

OTHER PUBLICATIONS

Provost, Pivoting and Folding Safety Gate, URL = https://www.provost-racking.com/pallet-gates/1219-pivoting-folding-safety-gate/, available at least as early as Feb. 1, 2021, 2 pages.
(Continued)

*Primary Examiner* — Justin B Rephann
(74) *Attorney, Agent, or Firm* — Robert A. Nissen

(57) ABSTRACT

A safety gate has: a structural frame including a pair of columns spaced from one another along a peripheral edge of an elevated platform to define a ledge entrance to a staging area of the elevated platform; a ledge gate; and a staging gate; and in which the ledge gate and the staging gate are connected to move together relative to the pair of columns: into a loading configuration when the ledge gate rises and pitches upward, and the staging gate lowers and unfolds laterally away from the pair of structural columns, to allow a) the ledge gate to open the ledge entrance and b) the
(Continued)

staging gate to enclose the staging area; and into an unloading configuration when the ledge gate lowers and pitches downward, and the staging gate rises and folds laterally toward the pair of structural columns, to allow a) the ledge gate to close the ledge entrance and b) the staging gate to expose the staging area.

18 Claims, 8 Drawing Sheets

(56) References Cited

U.S. PATENT DOCUMENTS

| | | | | | |
|---|---|---|---|---|---|
| 5,592,779 | A | | 1/1997 | Conway | |
| 5,701,701 | A | * | 12/1997 | Desrosiers | E05C 1/12 49/73.1 |
| 5,709,050 | A | | 1/1998 | Benko | |
| 5,941,024 | A | * | 8/1999 | Journault | E02D 29/1463 182/112 |
| 6,138,812 | A | * | 10/2000 | Kimener | E06B 11/00 49/133 |
| 6,212,826 | B1 | * | 4/2001 | Kimener | E06B 11/00 49/95 |
| 7,017,643 | B2 | * | 3/2006 | Leum | E06B 11/00 160/113 |
| 7,854,092 | B2 | * | 12/2010 | Stoffels | E06B 11/00 49/109 |
| 2004/0093798 | A1 | * | 5/2004 | Kimener | E06B 11/00 49/97 |
| 2005/0005522 | A1 | * | 1/2005 | Benko | E06B 11/00 49/50 |
| 2011/0302844 | A1 | | 12/2011 | Morey | |
| 2014/0047769 | A1 | | 2/2014 | Morey | |
| 2016/0047141 | A1 | * | 2/2016 | Juett | E04H 17/18 256/25 |
| 2018/0112413 | A1 | * | 4/2018 | Palasek | E04H 17/1413 |

OTHER PUBLICATIONS

Vestilmanufacturing, Mezz Mezzanine Safety Gates, YouTube video, URL = https://www.youtube.com/watch?v=X5niF_7Asu8, 2 pages.

Sicherheits-Schleusengelaender, Sicherheitssysteme, available at least as early as Feb. 1, 2021, 1 page.

Sicherheits-Schleusengelaender, Lock Type K, available at least as early as Nov. 23, 2018, 3 pages.

* cited by examiner

SAFETY GATES FOR ELEVATED PLATFORMS, AND RELATED METHODS OF USE

TECHNICAL FIELD

This document relates to safety gates for elevated platforms, and related methods of use.

BACKGROUND

The following paragraphs are not an admission that anything discussed in them is prior art or part of the knowledge of persons skilled in the art.

Safety gates exist for mezzanine use in industrial warehouses, operating via several different mechanisms, including garage-door-style rail and panel designs, cantilever teeter-totter designs, guillotine-style designs, and vertical-moving cage designs.

SUMMARY

A safety gate is disclosed comprising: a structural frame including a pair of columns spaced from one another along a peripheral edge of an elevated platform to define a ledge entrance to a staging area of the elevated platform; a ledge gate; and a staging gate; and in which the ledge gate and the staging gate are connected to move together relative to the pair of columns: into a loading configuration when the ledge gate rises and pitches upward, and the staging gate lowers and unfolds laterally away from the pair of structural columns, to allow a) the ledge gate to open the ledge entrance and b) the staging gate to enclose the staging area; and into an unloading configuration when the ledge gate lowers and pitches downward, and the staging gate rises and folds laterally toward the pair of structural columns, to allow a) the ledge gate to close the ledge entrance and b) the staging gate to expose the staging area.

A method is disclosed comprising: moving a ledge gate and a staging gate, relative to a pair columns, into a loading configuration, the pair of columns forming a structural frame and being spaced from one another along a peripheral edge of an elevated platform to define a ledge entrance to a staging area of the elevated platform, in which the ledge gate and staging gate are connected to move together, and in which while moving into the loading configuration the ledge gate rises and pitches upward, and the staging gate lowers and unfolds laterally away from the pair of structural columns, to allow a) the ledge gate to open the ledge entrance and b) the staging gate to enclose the staging area; and moving the ledge gate and the staging gate, relative to the pair of columns, into an unloading configuration, in which while moving into the unloading configuration the ledge gate lowers and pitches downward, and the staging gate rises and folds laterally toward the pair of structural columns, to allow a) the ledge gate to close the ledge entrance and b) the staging gate to expose the staging area.

A safety gate is disclosed comprising: a structural frame including a pair of columns spaced from one another along a peripheral edge of an elevated platform to define a ledge entrance to a staging area of the elevated platform; a ledge gate; and a staging gate; in which the ledge gate and the staging gate are connected to move together relative to the pair of columns: into a loading configuration when the ledge gate rises and pitches upward, and the staging gate moves, to allow a) the ledge gate to open the ledge entrance and b) the staging gate to enclose the staging area; and into an unloading configuration when the ledge gate lowers and pitches downward, and the staging gate moves, to allow a) the ledge gate to close the ledge entrance and b) the staging gate to expose the staging area; and in which the ledge gate is mounted to move along opposed rails on the pair of columns, the opposed rails define a curved portion of a path along which the ledge gate pitches during movement, the ledge gate defines a free base end and top end, and is mounted to pitch upward and downward via a first pivot axis intermediate the free base end and the top end.

Embodiments are disclosed where one or more of:

a. the gate orientation allows relatively greater clearance for pallet loads without making the frame taller;
b. the user has the ability to access a load on the mezzanine from three sides on the horizontal plane and to be picked up by crane from above (other gates have obstructions that prevent access from two or more directions);
c. the gate has a compact design that minimizes the overall footprint when in the closed position;
d. stiffeners/guards are integrated on the "front" of the gate (facing off the mezzanine) to limit forklift damage;
e. an installation system is provided that allows the gate to be installed on multiple types of mezzanines (concrete, steel, grating, wood etc.); and
f. integration points are provided to integrate with existing handrails.

In various embodiments, there may be included any one or more of the following features: The ledge gate is mounted to move along opposed rails on the pair of columns. The opposed rails define a curved portion of a path along which the ledge gate pitches during movement. The curved portion is an upper portion of the path. The opposed rails are structured to define the path with an upside-down-J-shape. The ledge gate defines a free base end and top end, and is mounted to pitch upward and downward via a first pivot axis intermediate the free base end and the top end. The ledge gate is mounted to pitch upward and downward via a second pivot axis intermediate the first pivot axis and the top end. The ledge gate is mounted to pitch about a pitch axis perpendicular to the pair of columns and parallel with the peripheral edge. A cable secured between the staging gate and the ledge gate, and supported on a cable guide mounted to the pair of columns above the ledge gate. The cable is secured to a free base end of the ledge gate. The cable comprises one or more of a rope, a chain, a belt, or a strap. The cable guide comprises one or more of a pulley, sprocket, bushing, or a sheave. The cable comprises or connects to a biasing device. The biasing device comprises a stretch limiter. The biasing device connects the cable to one or both of the staging gate and the ledge gate. The ledge gate is connected to move: into the loading configuration when a free base end of the ledge gate pitches outward laterally away from the pair of columns and the staging area; and into the unloading configuration when the free base end pitches inward laterally toward the pair of columns and the staging area. The ledge gate is oriented vertically in the unloading configuration, and horizontal or near-horizontal in the loading configuration. The ledge gate is oriented vertically in the unloading configuration, and approximately forty five degrees in the loading configuration. The staging gate comprises an end gate wall and opposed side gate walls. The end gate wall, opposed side gate walls, and the ledge cooperate in the loading configuration to define the staging area as having a rectangular shape. The opposed side gate walls are pivotally attached to the pair of columns and the end gate wall. The opposed side gate walls form respective four bar mechanical linkages that fold and deploy between the unloading and loading configurations, respectively. The elevated work platform is a mezzanine in a building. While the ledge gate and staging gate are in the loading configuration, depositing a load into the staging area via the ledge entrance. Depositing is done using a fork lift, and the load comprises a pallet. While the ledge gate and the staging gate are in the unloading configuration, removing a load from the staging area. Removing the load is done using a fork lift, and the load comprises a pallet. Removing the load is done using a crane.

The foregoing summary is not intended to summarize each potential embodiment or every aspect of the subject matter of the present disclosure. These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Figure 1:
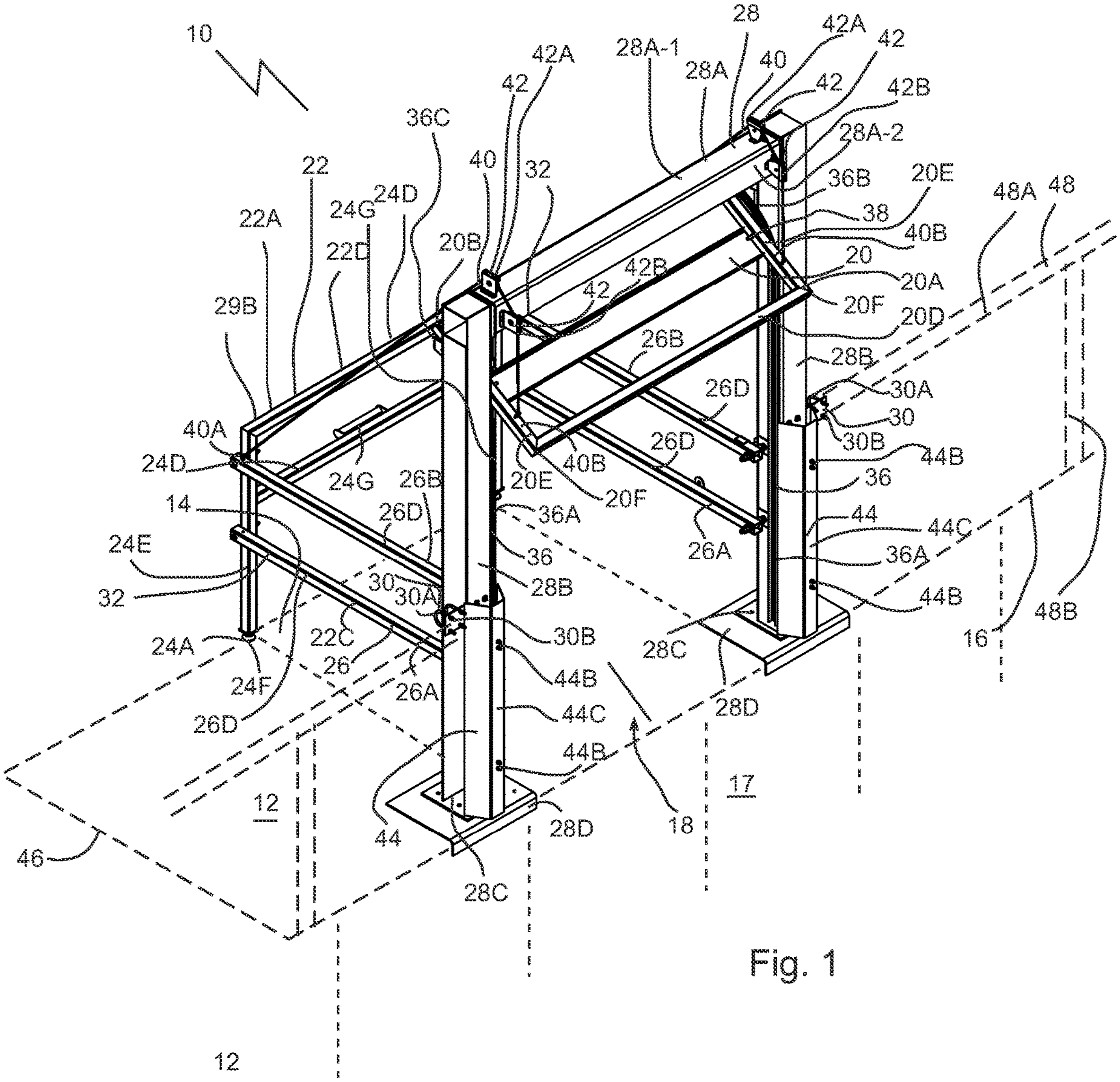
FIG. 1 is a front perspective view of a safety gate in a loading configuration, with a mezzanine ledge, mezzanine railing, and staging area shown in dashed lines.

Immaterial modifications may be made to the embodiments described here without departing from what is covered by the claims.

In buildings with high ceilings such as industrial warehouses, fulfillment centers, record retention centers, factories, chemical plants, and retail stores, a raised platform, also known as a mezzanine, may be used to optimize the storage density of equipment and materials and/or to increase the amount and utilization of floor space. These work platforms may be permanent or nonpermanent, engineered, structures. A mezzanine may be configured to be constructed and deconstructed separately from the building in which it is housed, thus allowing the facility to be flexibly repurposed. A mezzanine may include staircases, walkways, and elevated work areas accessible by personnel. A mezzanine may be used for overhead access of equipment, for example to facilitate the access of the top of process equipment. In one example warehouse personnel may use an elevated platform to empty a feedstock into a hopper at the top of blender or bagger machine, or to load and unload parts into a chemical bath. In the most common scenario, a mezzanine is used for storage, for example of various loads supported on wooden or other types of pallets. Elevated work platforms may be designed to permit access with forklifts, lift trucks, pallet lifters, and overhead cranes for the transfer of heavy loads.

Various types of machinery may be used to transport, lift, and lower a pallet within a warehouse. A pallet jack, also known as a pallet truck, pallet pump, pump truck, scooter, dog, or jigger is a tool used to lift and move pallets. Pallet jacks are the most basic form of a forklift and are intended to move pallets within a warehouse. A pallet jack is a mechanism that may be leveraged via manual or powered means. A classic example of a manually operated pallet jack is the tool most commonly referred to as a pallet jacket, and may incorporate a pneumatic or hydraulic mechanism that a user may crank to lift a pallet. A classic powered machine that operates a pallet jack is a forklift. A forklift (also called a lift truck, jitney, fork truck, fork hoist, and forklift truck) is a powered industrial truck used to lift and move materials over short distances. Forklifts are a critical element of any warehouse and distribution center. A forklift may be available in many variations and load capacities. The forklift is designed with a load limit for the forks (also called tines) which is decreased with fork elevation and undercutting of the load (i.e., when a load does not butt against the fork "L"). In a typical warehouse setting, most forklifts have load capacities between one and five tons, while larger machines, for example having up to 50 tons lift capacity, may be used for lifting heavier loads, such as loaded shipping containers. In addition to a control to raise and lower the forks (also known as blades or tines), the operator may be able to tilt the mast backward to compensate for a load's tendency to angle the blades toward the ground and risk slipping off the forks. Tilt also provides a limited ability to operate on non-level ground.

An elevated work platform in a building may incorporate various types of infrastructure to facilitate the storage and access of pallet-supported loads. Pallet racking is a type of elevated work platform common within industrial warehouses. Pallet racks are commonly used to store plural pallets of goods. The general structure of a pallet rack may be exploited to contain other items such as a picking module. A pick module may be present in the form of multi-level racking structures with conveyors throughout, in order to move products from the picking areas to the shipping areas. In the simplest example of a mezzanine, the elevated work platform comprises a level platform whose area may be used for storage, work, or other purposes.

Another example of an elevated work platform is a loading dock of a building. Industrial and other facilities may be equipped with loading docks that allow equipment to be moved in and out of tractor-trailer cargo bays or rail cars without having to lift or lower the equipment. The loading dock may be positioned at the same height as a tractor-trailer cargo bay so that personnel and forklifts may access the cargo bay without raising or lowering the materials (i.e. the load). When a tractor-trailer is not at the loading dock, the loading dock may form a ledge that presents a fall hazard for personnel, and even with the tractor-trailer is present there may be a hazardous gap or partial ledge. The loading dock may thus have need for safety apparatus at all times.

Referring to FIG. 1, an elevated work platform 12 may have railings or gates to mitigate the risk of falls to workers. Throughout industry, a mezzanine may be required by law (for example, occupational health and safety (OH&S) regulations derived from the Canada Labour Code) to encircle raised platforms with railings 48 (often, with a railing at least forty two inches high, a railing at a lower height and a toe board at the level of the platform). An elevated work platform 12 may present a serious fall hazard, which makes safety railings 48 critical to reduce or eliminate hazards of working at height. Safety railings 48 may have various suitable structures, such as laterally spaced columns 48B supporting horizontal beams 48A. Other structures may be used, including mesh or solid fencing.

A safety risk arises when a section of a ledge of an elevated work platform must be opened in order to deposit or remove a load to or from the elevated work platform. The presence of safety railings inhibits the ability of a forklift to raise material to the mezzanine. To meet the requirement for worker safety while allowing the movement of pallets on and off a mezzanine, railing may be provided with safety gates that can be temporarily opened for forklift access. A simple type of a safety gate is a sliding or pivoting section of railing that can be moved aside to open a gap in a railing. This style of gate allows forklift access and does not occupy much space, either on the work platform or in the space outside the work platform where the forklift may approach it. However, it does not eliminate the risk of fall, since, while the gate is open, there is no barrier between the ledge and a worker when a forklift is loading on or unloading a pallet from the platform. In order to address the inherent risk in even a simple, gate, various improvements of the basic safety gate have been attempted.

Some safety gates may incorporate two interlocked gates, one termed a ledge gate and another termed a rear gate. The ledge gate may form a segment of the railing when a forklift is not loading or unloading a pallet onto an elevated platform. The rear gate or staging gate may form a barrier between workers and a demarcated staging area from which a loaded pallet can be added or removed by a forklift. The gates may be interlocked such that both cannot be open or closed simultaneously, so that there is always a barrier between personnel and ledge. A safety gate may be manually operated or operated with the help of a powered actuator, for example an electric motor or hydraulic actuator. If the two gates are physically interlocked, the gates may be counterbalanced so that opening one tends to facilitate the closing of the other due to the shift of weight within the mechanism.

One type of a safety gate includes a pivoting structure, similar to a teeter totter, for example as disclosed in U.S. Pat. No. 5,709,050. This type of safety gate may have a rigid cage that pivots about a fixed fulcrum mounted on a section of or extension to a railing. The rigid cage may have two gates mounted at right angles to each other, enclosing three sides of the staging area and only one of which is pivoted into place at a time. This style of safety gate occupies a relatively large envelope. For example, if the staging area is a cube of equal dimensions, a safety gate of this construction may fill an envelope twice as high as the staging area and may swing into the aisle space as it shifts from its loading position to its closed position. Furthermore, when in the closed position, such a design may limit access to a pallet from all but one side and may fill a lateral space as wide as the staging area, even when in the closed position. It may also prevent access to a pallet from above when in the closed position, which may prevent unloading it through the use of an overhead crane.

Another type of safety gate may include a vertically translating front or rear gate that may be raised and lowered by a cable, rope, or belt, for example as disclosed in U.S. Pat. No. 5,592,779. Such a style of gate may operate similar to a guillotine. The front and rear gates may be substantially planar frames, or may be three-sided fences that delineate the staging area when in the loading position. The front and rear gates may be coupled using a cable such that only one of the two gates may be open at the same time. In some constructions, a rigid linkage may be used in lieu of a cable so that when one gate is manually actuated, the other can be positively actuated without relying on gravity. This type of safety gate may occupy a relatively large footprint, for example, twice as high as the staging area height. It may also, especially if it comprises a three-sided, vertically translating fence, prevent access to a pallet from more than one side by personnel. It may also prevent access to a pallet from above and occupy a large fraction of the staging area footprint when in the closed position.

Another type of safety gate may comprise a staging gate and a ledge gate, both of which have several articulated frame segments equipped with door rollers, such as those made by Mezzanine Safeti-Gates, Inc. Roly™. When one gate is opened, it may translate vertically while being guided along opposed tracks. The tracks may be shaped as if two garage door opening mechanisms were mounted opposite one another and the rails connected together, so opening the door on one end closes the door at the other end, and vice versa. This type of gate may have a reduced vertical envelope because the articulated gates do not need to translate their own entire vertical height to completely open. The frame to which the guide rails are mounted may occupy a large lateral footprint in both the open and closed positions, for example, at least as large as the staging area, and may also prevent lateral (three-sided) and vertical access to the staging area for pallet unloading by personnel.

Another type of safety gate may comprise a staging gate and a ledge gate that comprise a swing arm with an axis of rotation parallel to the direction of pallet loading. The swing arms may form a barrier of the required height and dimensions to satisfy OH&S legislation. The swing arms may be coupled by means of, for example, torque tubes and a gearbox so that they are interlocked and only one can be open at any time. These safety gates may occupy only a small vertical envelope (for example, no higher than the staging area height) in both the loading position and closed position, and they may allow vertical access to a pallet. If the swing arm forming the staging gate is substantially planar and only blocks one side of the staging area, fixed railing or frames may be required to block fall paths on the other two sides of the staging area, and so these safety gates may occupy a footprint at least as big as the staging area when in the closed position.

Another safety gate that may be used has two sets of spring-loaded swing arms, which may be fixed to a railing and may swing inward about vertical axes to allow entry of a pallet into a staging area, for example, the PICKER PAL™ Swing Arm). Such arms may be hinged and limited so that they will not swing outwards and thus present a fall barrier. These swing arms may occupy a small platform and vertical envelope, and may not obstruct the staging area at all when in the closed position. They may not eliminate fall hazards, however, since when a pallet is in the staging area the swing arms may be held open by the pallet and thus in that moment the only barrier between personnel and the ledge is the pallet and its contents. Furthermore, such gates may prevent or obstruct withdrawal of loaded pallets from the staging area.

Another safety gate system has a staging gate that is pivotally attached to a rigid frame so that it can be raised from a lowered position in which it obstructs the staging area, to a raised position, for example as disclosed in U.S. Pat. No. 2014/00047769. A pulley assembly on the frame is used to couple the staging gate to a second gate that is moveably attached to the frame, so that the gate can vertically translate to open and closed positions by being raised and lowered, respectively. The staging gate may be collapsed to a generally planar position when in the raised position. This type of safety gate may still occupy a vertical envelope twice the height of the staging area, such that the second gate may be vertically translated out of the pallet loading path.

The author has discovered that previous configurations of safety gates have multiple drawbacks. One of the most common drawbacks is the safety gate having a large footprint, either vertical or horizontal. It is common to have limited space on an elevated work platform, and thus it becomes disadvantageous to have a safety gate with a large footprint as it will reduce the amount of workable space on the platform. Many safety gates also only allow access to the pallet from one side. This becomes disadvantageous if a worker is using a manual pallet jack to move pallets away from the pallet staging area. Safety gates may also cause the staging gate to rise over top of the pallet when the ledge gate is in the down position. This may prevent access to the top of the pallet, for example by an overhead crane.

The author has thus discovered that several design features are advantageous in a mezzanine safety gate. It may be advantageous for a safety gate to occupy the smallest possible physical envelope, to preserve useful workspace on the elevated platform and to avoid blocking the passage of forklifts and lift trucks in adjacent aisle space. It may be advantageous to minimize the vertical envelope of a safety gate so it can be installed without restriction in many facilities. Some types of a safety gate may obstruct or limit vertical access to a pallet load, for example using an overhead crane, and/or may prevent access to the pallet from more than one side. Limiting access to one or more sides of the pallet may be disadvantageous if a worker is using a manual pallet jack to move pallets away from the pallet staging area, or in other cases. It may also be advantageous to provide a safety gate at low cost, without incidental hazards such as pinch points, and with imperviousness to corrosion which may be caused by corrosive atmospheres, such as in a chemical plant, or by frequent rinsing.

Referring to FIGS. 1-10, a safety gate 10 comprises a structural frame 28, a ledge gate 20, and a staging gate 22. The structural frame 28 may comprise a pair of columns 28B spaced from one another along a peripheral edge 16 of an elevated platform 12 to define a ledge entrance 18 to a staging area 14 of the elevated platform 12. The elevated platform 12 may, for example, be a mezzanine. The peripheral edge 16 of the platform 12 may be adjacent to a vertical wall 17, for example the riser wall of a mezzanine in a building. The ledge gate 20 and staging gate 22 may be connected to move together relative to the pair of columns 28B.

Referring to FIGS. 1-6, the safety gate 10 may be structured to assume a loading configuration in which the ledge gate 20 is up and the staging gate 22 is down. When moving into the loading configuration, the ledge gate 20 have been raised and pitched upwards. When moving into the loading configuration, the staging gate 22 may have been lowered and unfolded laterally away from the pair of structural columns 28B. The raising and pitching of the ledge gate 20 may allow the ledge gate 20 to open a ledge entrance 18. The lowering and unfolding of the staging gate 22 may allow the staging gate to enclose a staging area 14. During use, the gates 20 and 22 may be moved as one (via mechanical linkages for example) from the unloading to the loading configuration. The staging area 14 may define a zone in which a load, such as a pallet 88, may be placed during the transitional period between loading and unloading. The staging gate 22 and the structural frame 28 may define a staging area height 14A, staging area depth 14B and staging area width 14C that define the useful envelope that is available for personnel to load and unload pallets and cargo. Referring to FIGS. 7-11, the safety gate 10 may be structured to assume an unloading configuration in which the ledge gate 20 is down and the staging gate 22 is up. When moving into the unloading configuration, the ledge gate 20 may be lowered and pitched downward. When moving into the unloading configuration, the staging gate 22 may be raised and folded laterally against the pair of structural columns 28B. The lowering and pitching of the ledge gate 20 may allow the ledge gate 20 to close the ledge entrance 18. The raising and folding of the staging gate 22 may allow the staging gate 22 to expose the staging area 14.

Referring to FIG. 1, the safety gate 10 may be installed or otherwise mounted at a suitable location and/or may be integrated within the existing safety infrastructure of the platform 12. The gate 10 may be installed at or near or on the peripheral edge 16 of the platform 12, to maximize area of use available rearward of the edge 16 on the platform 12. The gate 10 may be integrated into the existing railings 48, to allow continuity of fall barrier protection along the edge 16, with external railings 48 running along the peripheral edge 16 of the mezzanine. The safety gate 10, for example the columns 28B, may connect to the external railings 48, for example may connect to beams 48A or columns 48B. Referring to FIGS. 1-11, a suitable connector or connecting mechanism, such as a guard rail connector 30, may be used to connect the frame 28 to the railing 48. The connector 30 may have a laterally extended mounting plate 30B, which supports one or more U-bolt or other mount 30A, which defines a railing beam receiving cavity that receives and grips an adjacent railing beam 48A. Other connection mechanisms may be used, such as welding, adhesive, fasteners, brackets, and others.

Figure 11:
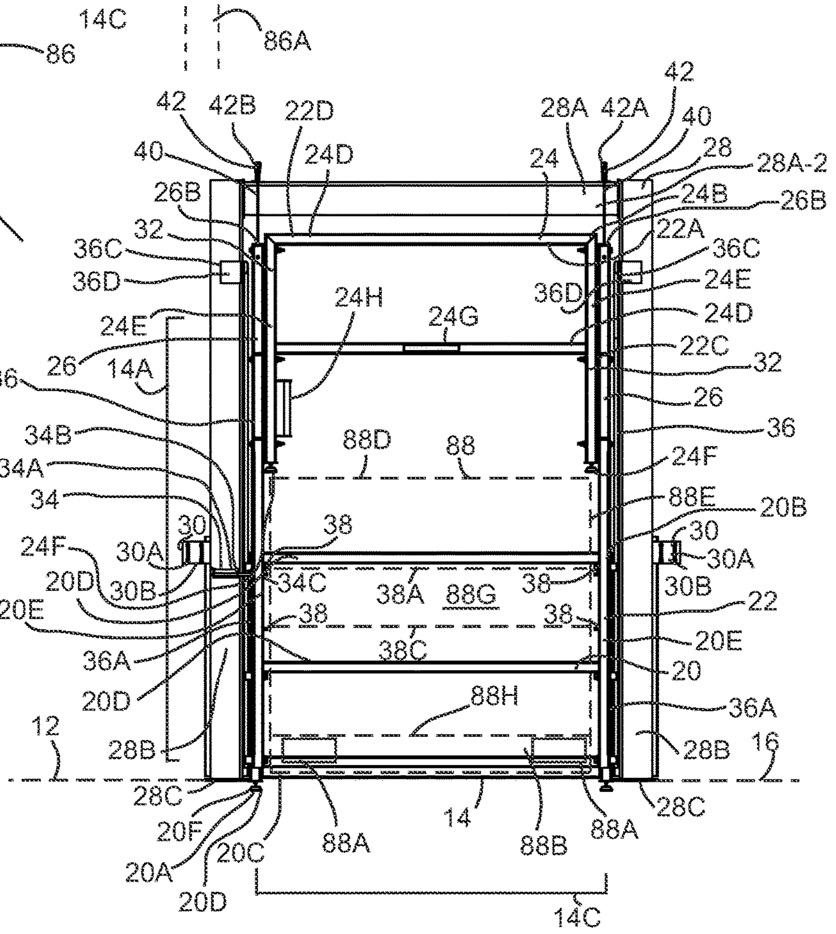
FIG. 11 is a front elevation view of the safety gate of FIG. 7 in the unloading configuration with the mezzanine ledge, staging area, and pallet load shown in dashed lines.

Referring to FIGS. 1, 3, 5 and 6, a load lifter, such as a machine that operates a pallet jack, for further example a forklift 86, may be used to deposit a load, such as a pallet 88, onto the staging area 14. The opening of the ledge gate 20, i.e. by raising the ledge gate 20, so it is above the staging area height 14A, exposes the ledge entrance 18 so that the entrance 18 is unobstructed to permit a forklift 86 to deliver a piece of cargo, such as pallet 88, into the staging area 14. One type of load may include a pallet 88, which is a platform structured to be lifted by a pallet jack, which carries a load 88C, which is supported on a top 88H of the pallet 88. Referring to FIG. 11, a pallet 88 may be structured to be engaged by the pallet jack, for example if the pallet 88 is equipped with tine receivers 88A that are sized and structured to receive a set of forklift tines 86A that may be in use inserted within the receivers 88A, in the pallet base 88B, to permit the pallet jack to lift, lower, and manipulate the load, for example to raise the pallet 88 to the level of the platform 12 and thereafter to advance and deposit the pallet 88 within the staging area 14. While the forklift 86 is delivering the pallet 88, a staging gate 22 may provide an uninterrupted railing around the staging area 14, for example around the rear end 22A, and the sides 22C of the staging gate 22, to protect the rear 14D and sides 14E of the staging area 14, to keep a user out of the staging area 14 and thus eliminate a fall hazard to workers because of the exposed peripheral edge 16.

Figure 8:
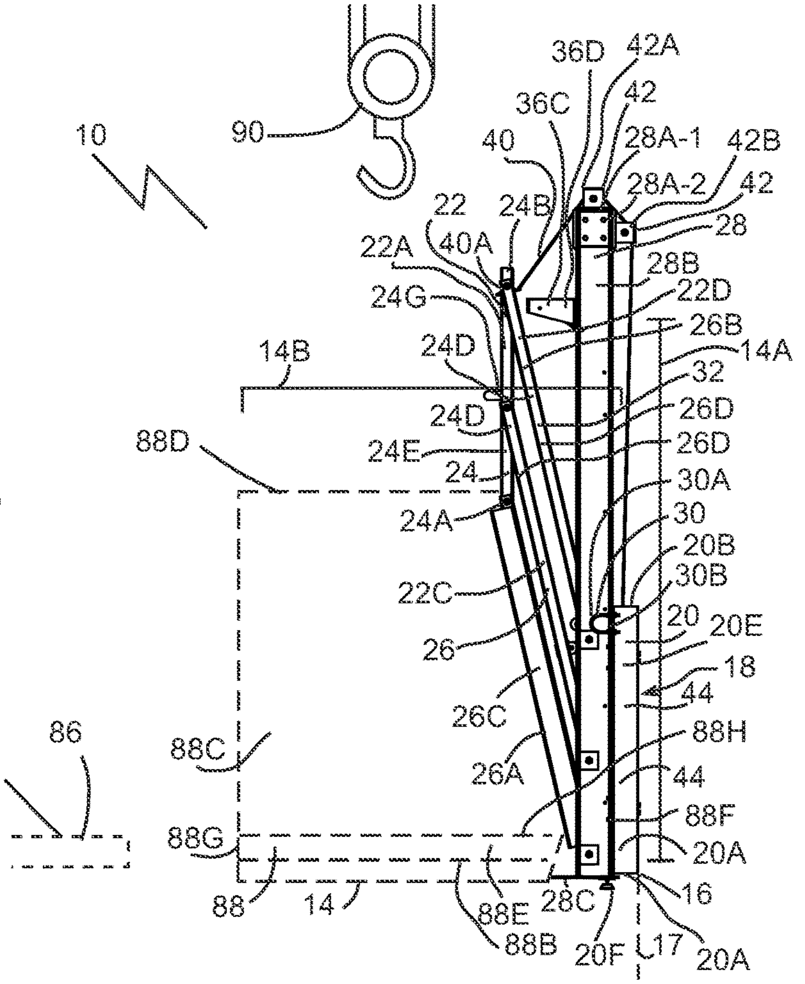
FIG. 8 is a side elevation view of the safety gate of FIG. 7 in the unloading configuration with the mezzanine ledge, staging area, and pallet load shown in dashed lines, and a crane hook shown in position to lift the pallet load.
Figure 9:
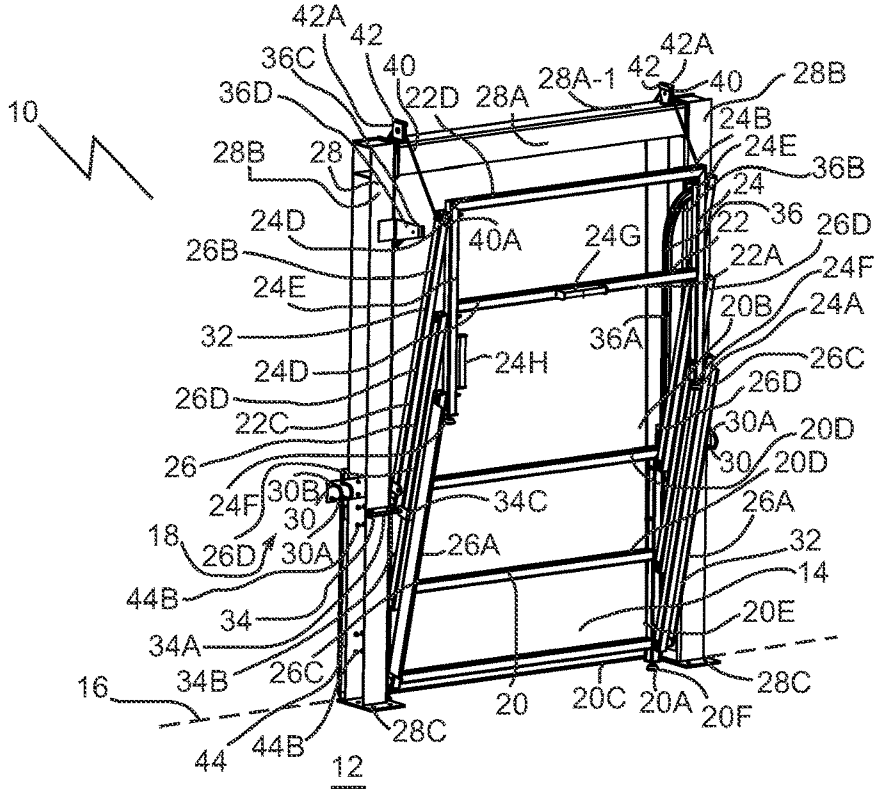
FIG. 9 is a rear perspective view of the safety gate of FIG. 7 in the unloading configuration with the mezzanine ledge and staging area shown in dashed lines.
Figure 10:
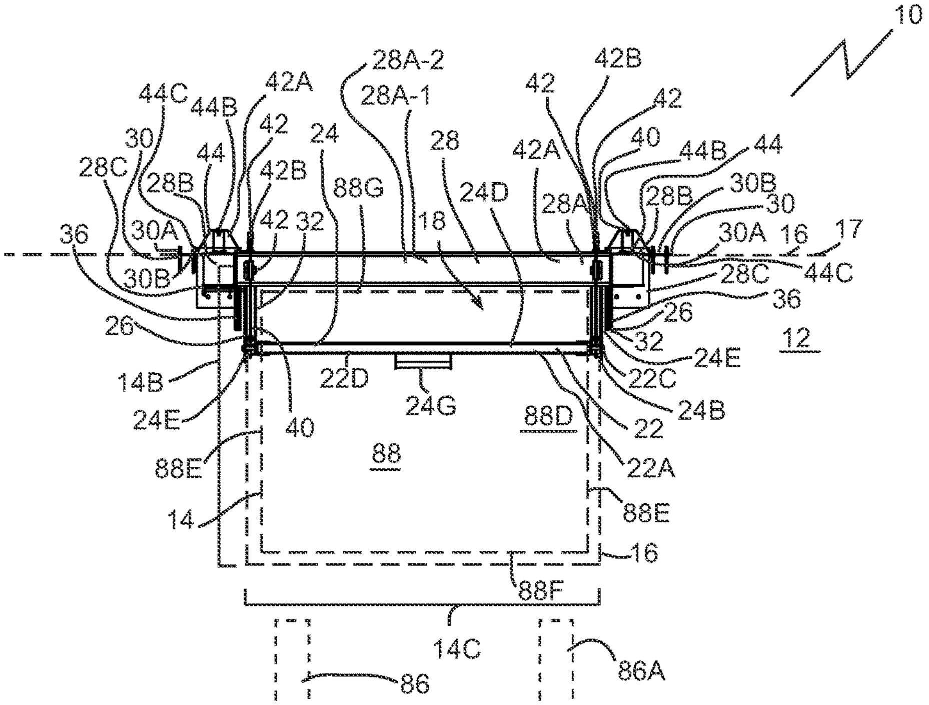
FIG. 10 is a top plan view of the safety gate of FIG. 7 in the unloading configuration with the mezzanine ledge, staging area, and pallet load, shown in dashed lines.

Referring to FIGS. 8 and 10, a load lifter, for further example a forklift 86, may be used to remove a load, such as a pallet 88, from the staging area 14. The opening of the staging gate 22, i.e. by folding and raising the gate 22, so it is above the staging area height 14A, exposes the staging area 14 from one or more of the rear 14D and sides 14E of the staging area 14, so that the staging area 14 is unobstructed from the rear and sides to permit a forklift 86 to extract a piece of cargo, such as pallet 88, from the staging area 14 to move the pallet 88 to another part of the platform 12. While in the unloading configuration the ledge gate 20 is down, thus providing continuous fall protection along edge 16 to permit a user to safely access the staging area 14. In some cases, the moving of the safety gate 10 into the unloading configuration permits a user or users to directly access, for example take apart, a load 88C without necessarily having to use a pallet jack to move the pallet 88 out of area 14. A staging gate 10 such as that shown in FIGS. 1-11 may be moved into an unloading configuration in which there is unobstructed access to the staging area 14, and there is no fall hazard to personnel because of a ledge gate 20. Cargo may be unloaded by another forklift 86, a hand truck or manual pallet jack, an overhead crane 90 (FIG. 8), jib crane, or other rigging equipment.

Referring to FIGS. 1-11, a ledge gate 20 may have a suitable structure. The ledge gate 20 may form a structural frame comprising one or more of beams 20D, columns 20E, feet 20F, and a toe board 20C. In some cases the gate 20 may have a planar appearance, for example if gate 20 is formed of a plate. However, a transparent or open structure as shown improves visibility and reduces material demands for manufacturing, without sacrificing safety and strength. The height and dimensions of the frame of gate 20 may be dictated by occupational health and safety law, which may, for example, prescribe a railing height of a horizontal beam 20D of not less than 42", and/or may prescribe a toe guard. In the unloading configuration the ledge gate 20 may be the sole barrier preventing a fall hazard. Horizontal beams 20D may define a ledge gate top end 20B, and a base end such as a ledge gate free base end 20A. The gate 20 may rest on the top surface of the elevated platform 12, for instance when the safety gate 10 is in an unloading position. A free base end 20A may be defined by toe guard or board 20C. The feet 20F may be equipped with a levelling or length adjustment mechanism such as a screw thread or other fastener or incremental/continuous length adjuster. A ledge gate 20 may be fabricated using suitable material, such as sheet metal and hollow structural sections and associated manufacturing methods such as bending, cutting and welding. Ground engaging feet 20F may incorporate a levelling mechanism to compensate for slight deviations in straightness and form of a ledge gate 20, or to adapt the gate 20 to non-level or non-planar work platforms 12. A toe guard may be mandated by OH&S legislation to avoid personnel slipping under the lowermost horizontal beam of the gate 20.

Referring again to FIGS. 1-11, a safety gate 10 may have a suitable structure. The staging gate 22 may comprise an end gate wall 24 that defines a rear end 22A of the staging gate 22. The staging gate 22 may comprise opposed side gate walls 26 that define sides 22C of the staging gate 22. The end gate wall 24, opposed side gate walls 26, and the elevated platform 12 may cooperate in the unloading configuration to define the staging area 14. The area 14 may have a suitable shape such as a rectangular shape, for example, a shape bigger than the standard plan dimensions of at least one pallet 88. A standard pallet size is forty eight inches by forty inches with each deck board being three and a half inches wide and five sixteenths of an inch thick, although other dimensions larger or small may be used. Clearance between the staging gate 22, ledge gate 20, and the sides 88E, rear end 88F, and front end 88G of the pallet 88 may be at least twelve inches, although other dimensions and clearances may be used. A top 22D of a staging gate may define the effective height of the staging gate 22, although not in the example shown. The staging gate 22 may be made in a suitable fashion with suitable materials, for example fabricated from bolted or welded steel sections.

Referring to FIGS. 1-11, the end gate wall 24 and/or side gate walls 26 may each form a suitable respective structural frame. For example, the end gate wall 24 may comprise one or more of beams 24D, columns 24E, feet 24F. Similarly, opposed side gate walls 26 of staging gate 22 may comprise one or more beams 26D, for example whose extent may be delimited by a side gate top end 26B. In some cases, the end gate wall 24 and/or the side gate walls 26 may include a toe board (not shown). However, in the case of end gate wall 24 the lower most beam 24D of the gate wall 24, and hence the toe board if present, may act to define or limit the height 14A of the staging area 14. In the example shown in FIG. 1, the toe board is not used, thus creating an upside-down U shape between beams 24D and legs/columns 24E and between columns 24E and beams 26D. In the example of FIGS. 2-11, a toe guard such as toe board 26C is used, to avoid personnel slipping under the lowermost horizontal beam 26D. In some cases the end gate wall 24 may have a planar appearance, for example if gate wall 24 or side gate wall 26 is formed of a plate. However, a transparent or open structure as shown improves visibility and reduces material demands for manufacturing, without sacrificing safety and strength. The height and dimensions of the frame of end gate wall 24 or side gate wall 26 may be dictated by occupational health and safety law, which may, for example, prescribe a railing height of a horizontal beam 24D or 26D of not less than forty two inches. In a loading configuration, end gate wall 24 and opposed side gate walls 26 may form part of an uninterrupted barrier that mitigates a fall hazard to personnel.

Referring to FIGS. 1-11, side and end gate walls 24 and 26 may have suitable characteristics. Horizontal beams 24D may define an end gate top end 24B, and a base end such as an end gate free base end 24A. The gate walls 24 or 26 may rest on the top surface of the elevated platform 12, for instance when the safety gate 10 is in an unloading position. The feet 24F may be equipped with a levelling or length adjustment mechanism such as a screw thread or other fastener or incremental/continuous length adjuster. An end or side gate wall 24 or 26 may be fabricated using suitable material, such as sheet metal and hollow structural sections and associated manufacturing methods such as bending, cutting and welding. Ground engaging feet 24F may incorporate a levelling mechanism to compensate for slight deviations in straightness and form of a gate end wall 24, or to adapt the end wall 24 to non-level or non-planar work platforms 12. A side gate free base end 26A may be defined by a beam 26D, and may rest on the elevated work platform 12 when a safety gate 10 is in an unloading configuration, or it may be supported by adjacent structures such as columns 24E of end gate wall 24. In the example of FIG. 1, an intermediate beam 24D may define the base end 24A, whereas in FIG. 2 a toe board 26C may define the base end 24A.

Referring to FIGS. 1-11, the structural frame 28 may have suitable components. Safety gate 10 may have a structural frame 28 that may comprise a lateral member/cross beam 28A (such as an overhead beam, and/or in some cases a base beam). Beam 28A may define a top 28A-1, front side 28A-2 and rear side 28A-3. Beam 28A may be mounted on and bridge/span structural columns 28B. Columns 28B may be anchored to platform 12 by a suitable fashion, for example mounted to platform 12 via a column base plate 28C. A column base plate 28C may be used to mount the structural frame 28 to the elevated work platform 12, for example by using concrete anchors to attach a base plate 28C to a poured concrete structure. Referring to FIG. 1, there may be provided a column footing plate 28C, which may serve to spread the footing load over a wider area or as an endstop. In other cases, other mechanisms of mounting the frame 28 rigidly to the platform 12 may be used, and in some cases the frame 28 may rest only by gravity upon the top surface of the platform 12. Beams in the structural frame 28, and indeed in all frames and structural members discussed in this document may have suitable construction, such as being box beams, angle beams, I-beams, C-beams, or others.

Referring to FIGS. 1-11, ledge gate 22 may be mounted by a suitable mechanism to the frame 28. The gate 22 may be mounted on opposed rails 36, which may themselves be mounted to or defined by structural frame 28, for example by one or more of fasteners, adhesives, welding, rivets, and/or brackets such as rail mounting brackets 36D. Thus, ledge gate 22 may be mounted to move along opposed rails 36 on the pair of structural columns 28B.

Figure 2:
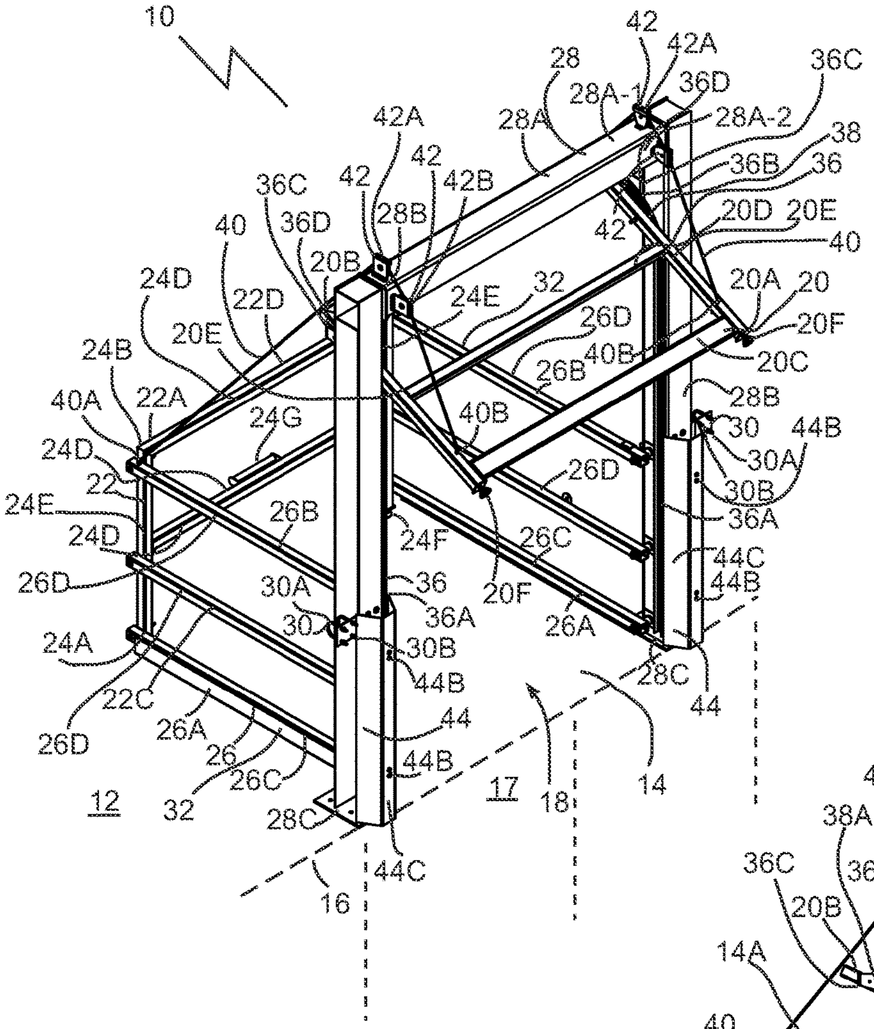
FIG. 2 is a front perspective view of another safety gate in a loading configuration, with a mezzanine ledge and staging area shown in dashed lines.
Figure 3:
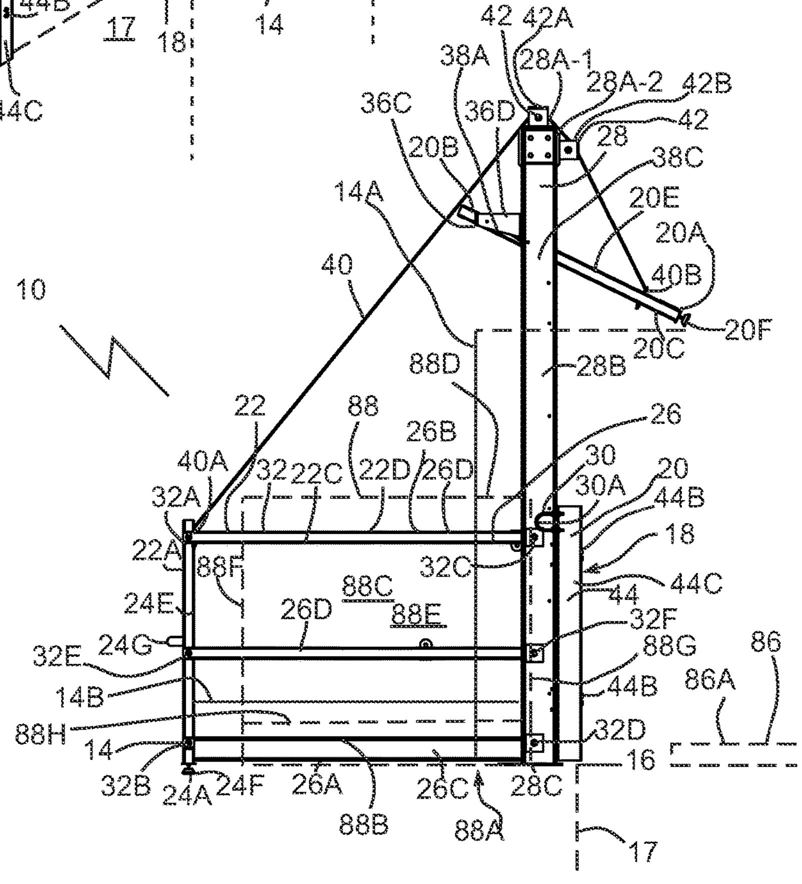
FIG. 3 is a side elevation view of the safety gate of FIG. 2 in the loading configuration with the mezzanine ledge, staging area, pallet load, and forklift tines shown in dashed lines.
Figure 4:
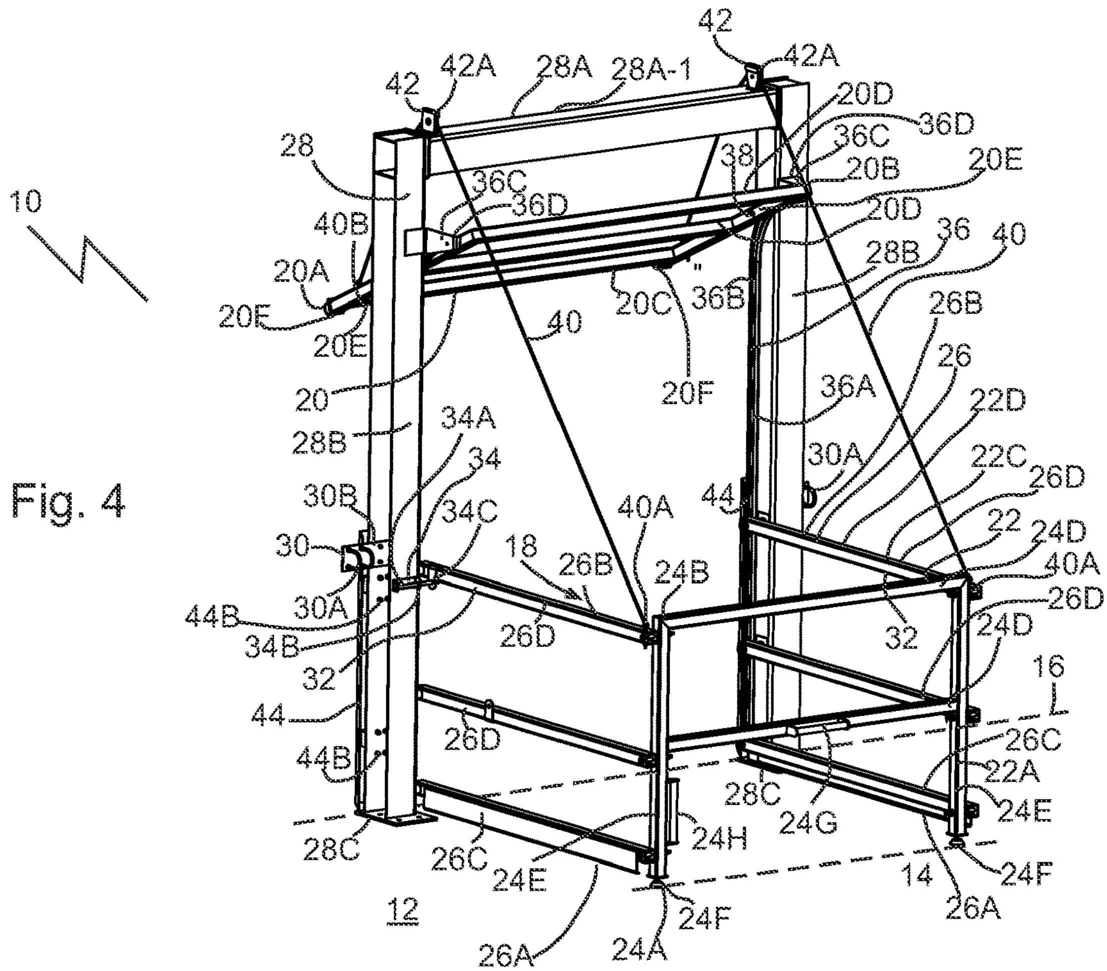
FIG. 4 is a rear perspective view of the safety gate of FIG. 2 in the loading configuration with the mezzanine ledge and staging area shown in dashed lines.
Figure 5:
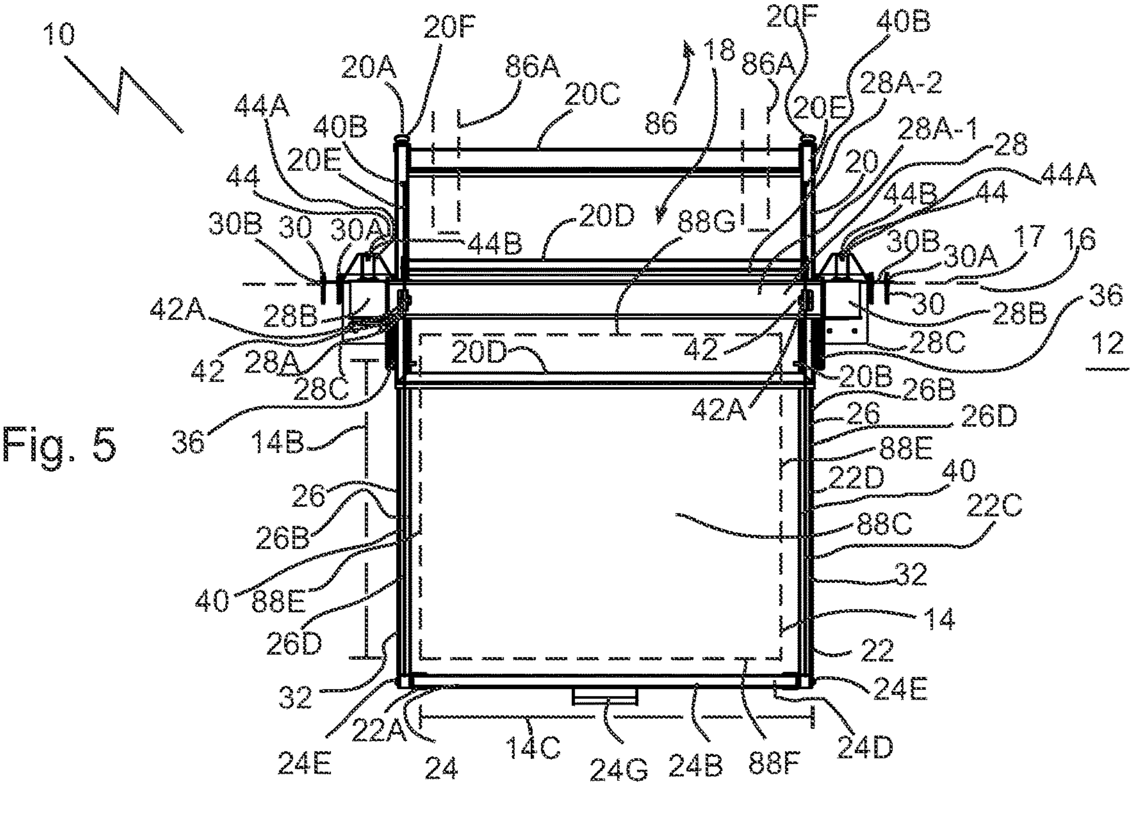
FIG. 5 is a top plan view of the safety gate of FIG. 2 in the loading configuration with the mezzanine ledge, staging area, pallet load, and forklift tines shown in dashed lines.
Figure 6:
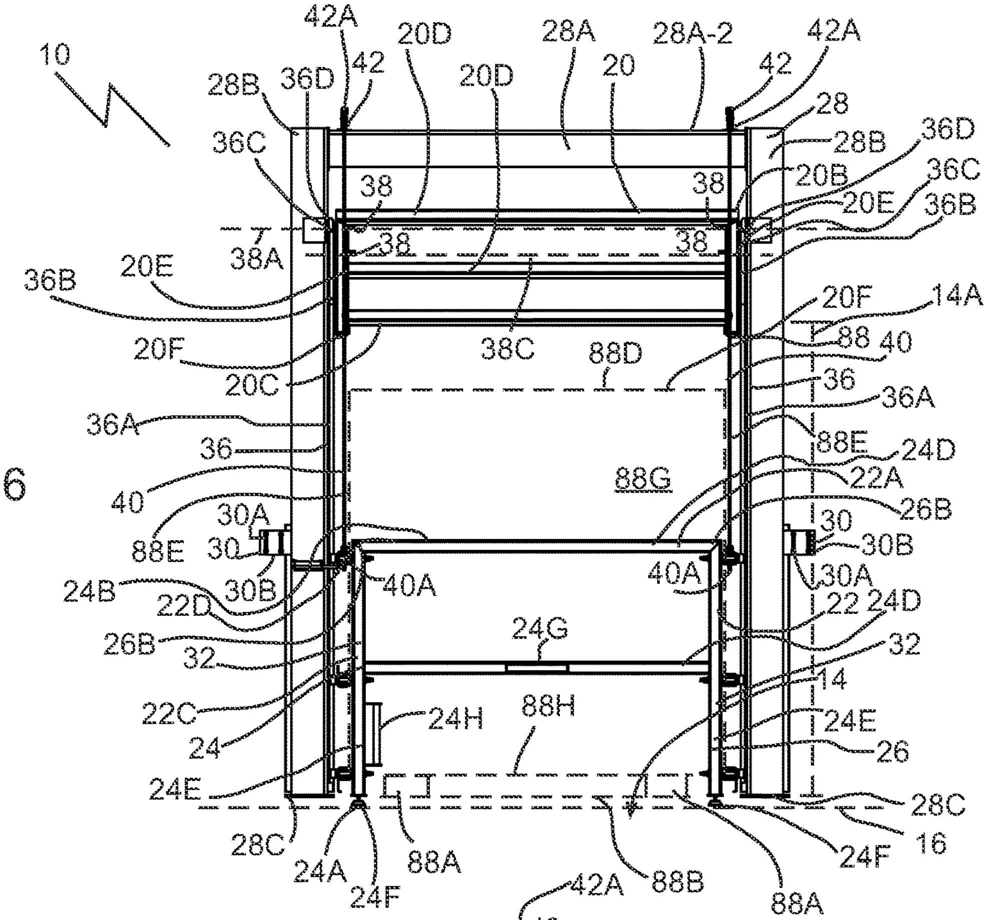
FIG. 6 is a rear elevation view of the safety gate of FIG. 2 in the loading configuration with the mezzanine ledge, staging area, and pallet load shown in dashed lines.
Figure 7:
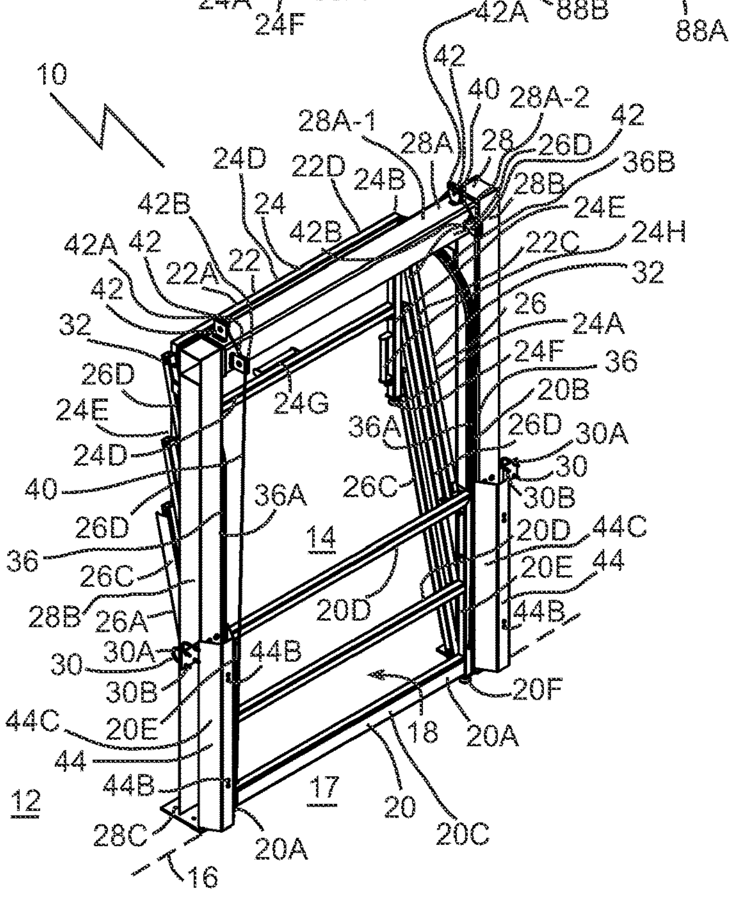
FIG. 7 is a front perspective view of the safety gate of FIG. 2 in an unloading configuration, with the mezzanine ledge shown in dashed lines.

Referring to FIGS. 1-11, ledge gate 20 may be configured to move in a suitable fashion between the loading and unloading configurations. The ledge gate 20 may be oriented vertically in an unloading configuration, for example as shown in FIGS. 5-11. The ledge gate 20 may be oriented horizontally or near-horizontally (for example within thirty degrees of horizontal) in the loading configuration, for example as shown in FIGS. 2-4. It may be advantageous to rotate (for example pitch) the gate 20 when moving into the loading configuration because the free base end 20A of the gate 20 may limit the maximum height 14A of the staging area 14 through which a load can be deposited onto area 14, so the higher the end 20A can sit in the loading configuration (up to horizontal) the more clearance is provided. To fully open a ledge entrance 18 without rotating, a ledge gate 20 would otherwise have to translate at least as far vertically as the height 14A of the staging area 14, and the supporting structural frame 28 would need to be accordingly tall enough to support the gate 20 in both configurations. A safety gate 10 in which the ledge gate 20 rotates as it transitions between configurations may be smaller, lighter, and less costly.

Referring to FIGS. 1-11, the rails 36 may define a suitable path of movement for the gate 20 to pitch via a pivot point or pivot points defined by the gate 20. The path may include one or more of a straight portion 36A and a curved portion 36B. While moving along the curved portion 36B, the ledge gate 22 pitches during movement. The use of curved and straight portions cooperate to partially translate and partially pitch the gate 20 during travel into the loading configuration. The curved portion 36B may be an upper portion of the path, and the opposed rails 36 may be structured to define a path with an upside-down-J-shape. At the top end of the opposed rails 36, the travel of the ledge gate 20 may be limited by top end stops 36C. A ledge gate 20 may be mounted to opposed rails 36 with guide connectors 38, for example, track rollers or door rollers. Guide connectors 38 may allow rolling motion between the ledge gate 20 and opposed rails 36 so that the gate may translate and rotate with little friction and wear, and also the guide connectors 38 may permit the gate 20 to pitch about the connectors 38. A first set of rollers 38B may define first pivot axis 38A about which rollers 38B may allow mutual rotation between a ledge gate 20 and rails 36. A second set of rollers 38D may define a second pivot axis 38C, for example parallel to first pivot axis 38A, about which second set of rollers 38D may allow mutual rotation between a ledge gate 20 and rails 36. The ledge gate 20 may be mounted to pitch about a pitch axis (such as axes 38A and 38C) perpendicular to the pair of columns 28B and parallel with the peripheral edge 16.

Referring to FIGS. 1-11, opposed rails 36 and gate 20 may be structured such that a free base end 20A of the ledge gate 20 pitches outward and inward relative to the columns 28B. The free base end 20A may pitch outward laterally away from the pair of columns 28B and the staging area 14 when moving into the loading configuration. The free base end 20A may pitch away from the ledge entrance 18 of the safety gate 10 as the ledge gate 20 is actuated from an unloading configuration to a loading configuration. Such pitching may increase the useful size of a staging area 14 relative to the size of a structural frame 28, when compared with other safety gates in which a ledge gate translates vertically only or moves as a garage door without any free base end swing outside the path of movement defined by rails 36. For example, ledge gate 20 may define a free base end 20A and top end 20B, and may be mounted to pitch upward and downward via first pivot axis 38A intermediate the free base end 20A and the top end 20B. The ledge gate 20 may be mounted to pitch upward and downward via second pivot axis 38C intermediate the first pivot axis 38A and the top end 20B. Thus, the free base end 20A swings outward, reducing the lateral distance it has to travel toward the rear end (defined by end gate wall 24) of gate 10 while still moving into a horizontal or near horizontal position where staging entry height is maximized. In the example shown, the ledge gate 20 may be connected to move into the unloading configuration when the free base end 20A pitches inward laterally toward the pair of columns 28B and the staging area 14.

Referring to FIGS. 1-11, the staging gate 22 may be structured to fold in various ways. The opposed side gate walls 26 may be pivotally attached to one or both the pair of columns 28B and the end gate wall 24. In some cases the gate 22 may swing in a teeter totter fashion. In other cases the gate 22 may fold in an accordion fashion. The gate 22 may be structured to assume a laterally compact configuration when in the unloading configuration, and a laterally extended configuration when deployed in the loading configuration. The gate 22 may be structured to move to lift the end gate wall 24 above a pallet 88 and load positioned in the staging area 14, for example to life the end gate wall 24 over four feet in height above a rear end 88F of the pallet 88, and to clear a top 88D of the pallet 88.

Referring to FIGS. 1-11, the staging gate 22 may be structured to move via a suitable mechanical linkage (levers) to fold and unfold. Referring to FIGS. 3 and 8, the opposed side gate walls 26 may form respective four bar mechanical linkages that fold and deploy between the unloading and loading configurations, respectively. A four-bar linkage, also called a four-bar, is the simplest movable closed-chain linkage, and may have four bodies, called bars or links, connected in a loop by four joints. Generally, the joints may be configured so the links move in parallel planes, and the assembly is called a planar four-bar linkage. Each side wall 26 may define a side gate free base end 26A, a side gate top end 26B, one or more horizontal beams 26D, a toe board 26C (not present in FIG. 1), and feet 26F. The side gate free base end 26A is the portion of the side walls 26 that is nearest the floor and may comprise a toe board 26C. The side gate top end 26B may be defined by the horizontal beam 26D that is the uppermost beam of the side walls 26. The opposed side gate walls 26, for example the uppermost beam 26D, may be pivotally attached to the columns 24E of the end gate wall 24, forming a first linkage axis 32A. The lowermost beam 26D or toe board 26C may be pivotally attached to columns 24E of end gate wall 24, forming a second linkage axis 32B. The uppermost beam 26D may be pivotally attached to the structural columns 28B, forming a third linkage axis 32C. The lowermost beam 26D or toe board 26C may be pivotally attached to the structured columns 28B, forming a fourth linkage axis 32D. There may be additional horizontal beams 26D present, and if such is the case, then a fifth linkage axis 32F is present on the structural columns 28B between the third linkage axis 32C and the fourth linkage axis 32D, and a sixth linkage axis 32E is present on the end gate side columns 24E between the first linkage axis 32A and the second linkage axis 32B. The pivotal attachment of the side gate walls 26 may allow the safety gate 10 move between the loading and unloading configurations by folding and unfolding. When the safety gate 10 is in the loading configuration, the horizontal beams 26D of the side walls 26 may be parallel to the elevated platform 12 of which the safety gate 10 is installed on. In order to move to the unloading configuration, force may be applied to lift the gate wall 24, for example using an end gate beam handle 24G, which may cause the side gate free base end 26A, the side gate top end 26B, the side gate toe board 26C and any other horizontal beams 26D present on the side gate wall 26, to rise and fold laterally against the pair of structural columns 28B. The end gate wall 24 may remain vertical at all times between loading and unloading configurations. Other mechanical linkages may be used.

Referring to FIGS. 1-11, the ledge gate and staging gate may be connected to move together. The ledge gate 20 may be connected to the movement of the side gate walls 26 and/or end gate wall 24. The ledge gate 20 may move into the loading configuration when a free base end 20A of the ledge gate 20 pitches outward laterally away from the pair of columns 28B and the staging area 14, while the side gate walls 26 move outward from the pair of columns 28B and towards the staging area 14. The ledge gate 20 may move into the unloading configuration when the free base end 20A pitches inward laterally toward the pair of columns 28B and the staging area 14, while the side gate walls 26 move inward towards the pair of columns 28B and outward from the staging area 14.

Referring to FIGS. 1-11, as above the ledge gate 20 and the staging gate 22 may be connected to move together. Such may allow for the constant continuation of the fall protection of the external railing 48 along the peripheral edge 16 of the elevated work platform 12 despite the configuration of the safety gate 10. When the safety gate 10 is in the loading configuration, the staging gate 22 is down, preventing access to the peripheral edge 16. When the safety gate 10 is in the unloading position, the ledge gate 20 is down and prevents access to the peripheral edge. The constant continuation of the external railing 48 through the use of the safety gate 10 may mitigate the fall risk of being on an elevated work platform, while still allowing the loading and unloading of pallets onto the elevated work platform. The staging gate 22 and the ledge gate 20 may be lowered and raised through the use of a powered actuator, for example an electric motor or hydraulic actuator. The staging gate 22 and the ledging gate 20 may be counterbalanced to allow them to be physically interlocked and move in opposite directions of each other through the use of a suitable mechanism such as a cable 40 and a cable guide 42.

Referring to FIGS. 1-11, the staging gate 22 and the ledge gate 20 may be connected through a suitable connector, such as a cable 40 secured between the staging gate 22 and the ledge gate 20. The cable 40 may be supported on a cable guide 42 mounted to the pair of columns 28B above the ledge gate 20. The cable 40/connector may comprise one or more of a rope, a chain, a belt, or a strap, or other mechanism for transferring force through tension. The cable 40, may be connected to the staging gate 22 through the use of a staging gate mount 40A, which may be located on the side gate top end 26B and/or end gate wall 24. The cable 40 may extend to and be secured to the ledge gate 20, for example through the use of a ledge gate mount 40B. The ledge gate mount 40B may be located at a suitable position, for example at or near a free base end 20A of the gate 20. The cable 40 may run through a cable guide 42 which may comprise one or more of a pulley, bushing, or a sheave. The cable guide 42 may be located above the staging area height 14A and may otherwise be above the mounting points of the cable to the staging gate 22 and the ledge gate 20. For example the guide 42 may be mounted on the cross beam 28A of structural frame 28. The cable guide 42 may ensure that the cable 40 is operated smoothly and efficiently between the staging gate 22 and the ledge gate 20. The cable guide 42 may comprise plural guides on each side of gate 10, for example top sheaves 42A, located on the top wall 28A-1 of the cross beam 28A, and the bottom sheaves 42B, located on the front side 28A-2 of the cross beam 28A. The location of the cable mounting points on each of gates 20 and 22 may be selected to counterbalance the movement of both gates 20 and 22 in either direction, to minimize force required to change configurations and to avoid a sudden release of energy in the form of a gate dropping rapidly in the case of an unbalanced load.

Referring to FIGS. 1-11, various mechanisms may be used to operate the safety gate 10. End gate wall 24 may incorporate one or more of beam or column handles 24G and 24H, respectively. A lock 34 may be used to lock the staging gate 22 and/or ledge gate 20 in place. The lock 34 may have a bracket 34A, a spring pin 34B, and a pin received 34C. The lock may have another suitable structure. A handle (not shown) may be located on the ledge gate 20. The actuator or operation mechanism, such as any of the aforementioned handles, may be located outside the staging area 14, to permit use only by a user outside the staging area 14, to prevent unsafe misuse of the gate 10. One or more pulleys or other mechanisms may be used to operate the gate 10.

Referring to FIGS. 1-11, one or more ledge gate guards 44 may be used. For example a guard bracket 44A may work with guard bolts 44B and a bent guard plate 44C. A checketer plate 46 may be used.

Figures 12, 12A, 13:
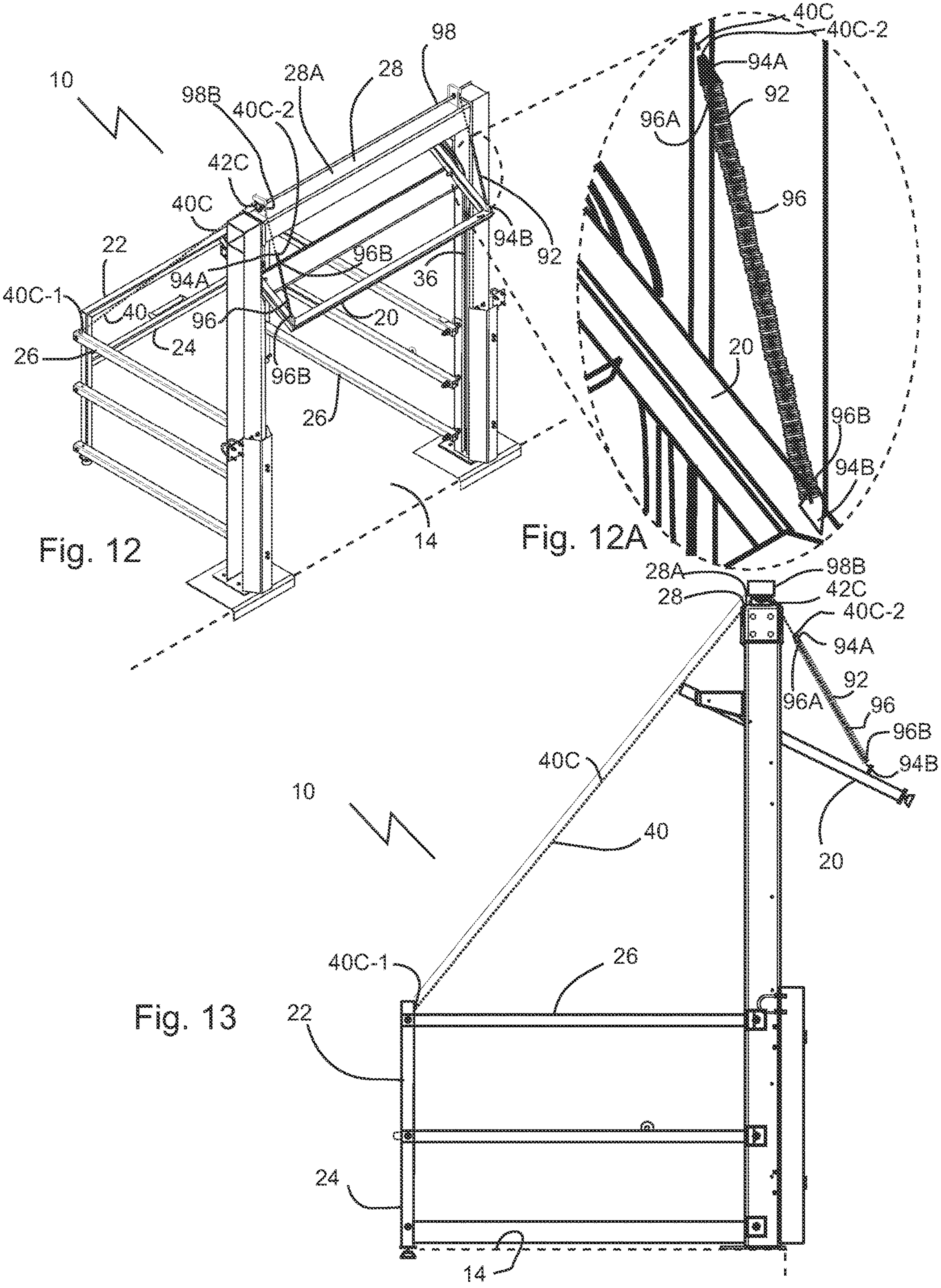
FIG. 12 is a front perspective view of another embodiment of a safety gate, illustrated in a loading configuration, with a mezzanine ledge shown in dashed lines.
FIG. 12A is a close up view of an area denoted by dashed lines in FIG. 12.
FIG. 13 is a side elevation view of the safety gate of FIG. 12 in the loading configuration with the mezzanine ledge and staging area shown in dashed lines.
Figure 14:
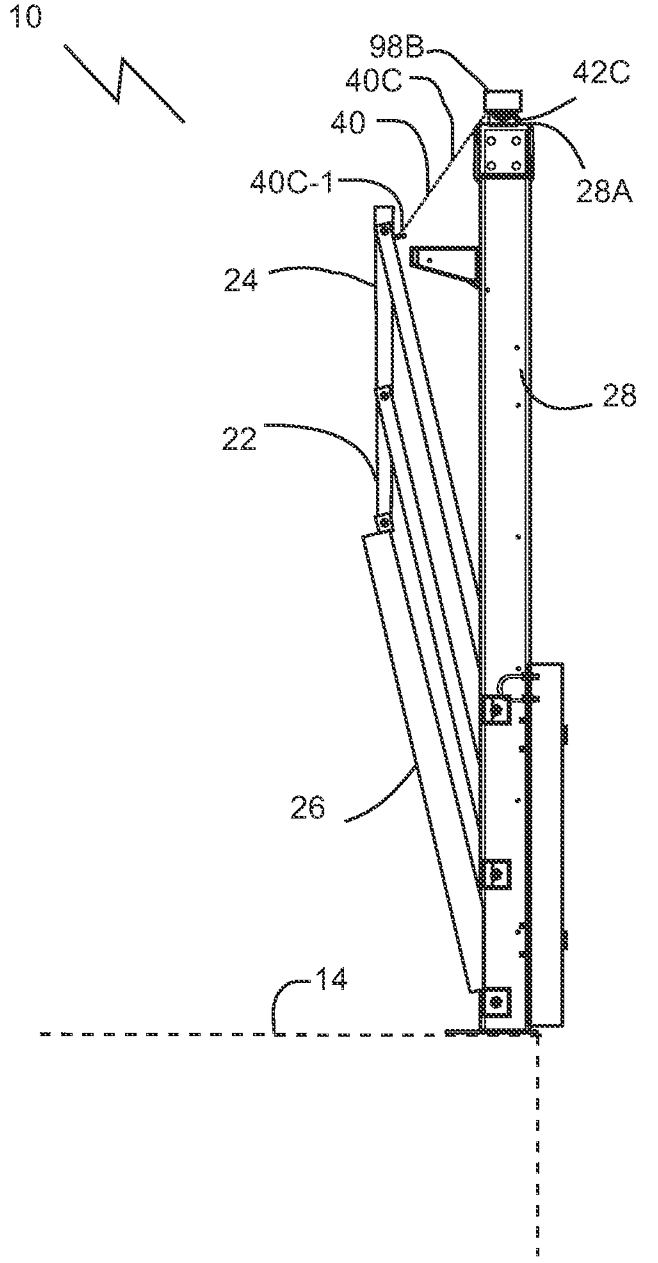
FIG. 14 is a side elevation view of the safety gate of FIG. 12 in an unloading configuration with the mezzanine ledge and staging area shown in dashed lines.

Referring to FIGS. 12, 12A, and 13-14, another embodiment of a safety gate 10 is illustrated. In the example shown the cable 40 comprises a chain, such as a roller chain 40C. The roller chain 40C may travel along a suitable guide 42 such as sprockets 42C. A pair of sprockets 42C may be connected to rotate together, for example via a timing shaft 98, to synchronize the chains 40C on each side of the gate 10. The sprockets 42C may each mount for rotation to respective structural members such as posts 98B, for further example using bearings or bushings (not shown). The posts 98B may be mounted on the structural frame 28. The shaft 98 may extend through the posts 98B and may mount each sprocket 42C. The synchronization of the rotation of the roller chains 40C may reduce the chance of the gate 10 becoming cocked in the guides 36. The cable 40 may comprise or be connected to a biasing device, such as a spring or springs 92, that connect the roller chain 40C, to one or both of the staging gate 22 and the ledge gate 20. In the example shown, the roller chain 40C connects at one end 40C-1 to the staging gate 22 and at another end 40C-2 to the spring 92. The springs 92 may connect to end 40C-2 of the roller chain 40C via a suitable connector 94A, such as a shaft or collar. The springs 92 may connect to the ledge gate 20 via a suitable connector 94B, such as a bracket as shown. The biasing device may comprise a stretch limiter, such as a limit cable 96, for the biasing device. The stretch limiting cable 96 may be a non-extendible or relatively non-extendable (relative to the spring 92) cable of a predetermined length selected to restrict or prevent the overstretching of the springs 92. Referring to FIG. 12A, in the example shown, the stretch limiting cable 96 connects at one end 96A to the connector 94A and another end 96B to the connector 94B on the ledge gate 20. The stretch limiting cables 96 may prevent or restrict the springs 92 from stretching past a certain point, which may depend on the length of the stretch limiting cable 96. The springs 92 may be effective to pull the staging gate 22 tight when the gate 10 is in the unloading configuration.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A safety gate comprising:

a structural frame including a pair of columns spaced from one another along a peripheral edge of an elevated platform to define a ledge entrance to a staging area of the elevated platform;

a ledge gate; and a staging gate;

in which the ledge gate and the staging gate are connected to move together relative to the pair of columns:

into a loading configuration when the ledge gate rises and pitches upward, and the staging gate moves, to allow a) the ledge gate to open the ledge entrance and b) the staging gate to enclose the staging area; and into an unloading configuration when the ledge gate lowers and pitches downward, and the staging gate moves, to allow a) the ledge gate to close the ledge entrance and b) the staging gate to expose the staging area; and in which the ledge gate is mounted to move along opposed rails on the pair of columns, the opposed rails define a curved portion of a path along which the ledge gate pitches during movement, the ledge gate defines a free base end and top end, and is mounted to pitch upward and downward via a first pivot axis intermediate the free base end and the top end.

2. The safety gate of claim 1 in which the ledge gate and the staging gate are connected to move together relative to the pair of columns:

into the loading configuration when the staging gate lowers and unfolds laterally away from the pair of structural columns; and into the unloading configuration when the staging gate rises and folds laterally toward the pair of structural columns.

3. The safety gate of claim 2 in which:

the curved portion is an upper portion of the path; and the opposed rails are structured to define the path with an upside-down-J-shape.

4. The safety gate of claim 3 further comprising a cable secured between the staging gate and the ledge gate, and supported on a cable guide mounted to the pair of columns above the ledge gate.

5. The safety gate of claim 4 in which:

the cable is secured to the free base end of the ledge gate;

the cable comprises one or more of a rope, a chain, a belt, or a strap;

the cable guide comprises one or more of a pulley, sprocket, bushing, or a sheave; and the cable comprises or connects to a biasing device.

6. The safety gate of claim 5 in which the biasing device comprises a stretch limiter.

7. The safety gate of claim 1 in which:

the ledge gate is mounted to pitch upward and downward via a second pivot axis intermediate the first pivot axis and the top end; and the first and second pitch axes are perpendicular to the pair of columns and parallel with the peripheral edge.

8. The safety gate of claim 1 in which the ledge gate is connected to move:

into the loading configuration when the free base end of the ledge gate pitches outward laterally away from the pair of columns and the staging area; and into the unloading configuration when the free base end pitches inward laterally toward the pair of columns and the staging area.

9. The safety gate of claim 1 in which the ledge gate is oriented vertically in the unloading configuration, and horizontal, near-horizontal, or approximately forty five degrees in the loading configuration.

10. The safety gate of claim 1 in which:

the staging gate comprises an end gate wall and opposed side gate walls; and the end gate wall, opposed side gate walls, and the ledge cooperate in the loading configuration to define the staging area as having a rectangular shape.

11. The safety gate of claim 10 in which the opposed side gate walls are pivotally attached to the pair of columns and the end gate wall.

12. The safety gate of claim 11 in which the opposed side gate walls form respective four bar mechanical linkages that fold and deploy between the unloading and loading configurations, respectively.

13. The safety gate of claim 1 in which the elevated work platform is a mezzanine in a building.

14. A method comprising:

moving a ledge gate and a staging gate, relative to a pair columns, into a loading configuration, the pair of columns forming a structural frame and being spaced from one another along a peripheral edge of an elevated platform to define a ledge entrance to a staging area of the elevated platform, in which the ledge gate and staging gate are connected to move together, and in which while moving into the loading configuration the ledge gate rises and pitches upward, and the staging gate moves, to allow a) the ledge gate to open the ledge entrance and b) the staging gate to enclose the staging area;

moving the ledge gate and the staging gate, relative to the pair of columns, into an unloading configuration, in which while moving into the unloading configuration the ledge gate lowers and pitches downward, and the staging gate moves, to allow a) the ledge gate to close the ledge entrance and b) the staging gate to expose the staging area; and in which the ledge gate is mounted to move along opposed rails on the pair of columns, the opposed rails define a curved portion of a path along which the ledge gate pitches during movement, the ledge gate defines a free base end and top end, and is mounted to pitch upward and downward via a first pivot axis intermediate the free base end and the top end.

15. The method of claim 14 further comprising, while the ledge gate and staging gate are in the loading configuration, depositing a load into the staging area via the ledge entrance.

16. The method of claim 15 in which depositing is done using a fork lift, and the load comprises a pallet.

17. The method of claim 14 further comprising, while the ledge gate and the staging gate are in the unloading configuration, removing a load from the staging area.

18. The method of claim 17 in which:

removing the load is done using a fork lift, and the load comprises a pallet; or removing the load is done using a crane.

* * * * *